（12） United States Patent
Yamaguchi et al.

(10) Patent No.: US 6,629,707 B1
(45) Date of Patent: Oct. 7, 2003

(54) PIPE JOINTING UNIT

(75) Inventors: Naoki Yamaguchi, Aichi-ken (JP); Toshihiko Yamanaka, Aichi-ken (JP); Yoshiaki Kanoh, Aichi-ken (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 14 days.

(21) Appl. No.: 09/656,441

(22) Filed: Sep. 6, 2000

(30) Foreign Application Priority Data

Sep. 6, 1999 (JP) .......................................... 11-252107

(51) Int. Cl.[7] ................................................ F16L 39/00
(52) U.S. Cl. ............................ 285/319; 285/87; 285/88
(58) Field of Search ........................ 285/81, 310, 319, 285/351, 363, 87, 88, 348

(56) References Cited

U.S. PATENT DOCUMENTS 5,992,895 A * 11/1999 Steinkamp .................. 285/319
6,328,349 B2 * 12/2001 Bandlow et al. ............ 285/319

FOREIGN PATENT DOCUMENTS

| JP | 5280678 | * 10/1993 |
| JP | 7-24716 | 6/1995 |
| JP | 10252969 | * 9/1998 |

* cited by examiner

*Primary Examiner*—Lynne H. Browne
*Assistant Examiner*—Aaron Dunwoody
(74) *Attorney, Agent, or Firm*—Burns, Doane, Swecker & Mathis, LLP

(57) ABSTRACT

A pipe jointing unit includes a cylindrical joint in which is accommodated a pipe, a ring-shaped seal member positioned in the joint, an elastic connecting member positioned in the joint and holding the pipe and the ring-shaped seal member in the joint, and a guide member detachably connected to the joint. The guide has an annular guide portion which is disposed circumferentially between the inner surface of the edge portion of the joint and the outer surface of the pipe. The pipe is thus restricted from swinging in the radial direction relatively against the joint and the reliability of the resistance force against pulling the pipe out of the connecting member by vehicle vibration, an increase of the internal pressure of the pipe and the like is improved.

11 Claims, 3 Drawing Sheets

# PIPE JOINTING UNIT

FIELD OF THE INVENTION

The present invention generally relates to a jointing unit. More particularly, the present invention pertains to a pipe jointing unit for jointing a variety of pipes in a vehicle and the like.

BACKGROUND OF THE INVENTION

An example of a known type of pipe jointing unit is disclosed in Japanese Utility Model Publication No. Hei 7-24716 published on Jun. 5, 1995. This pipe jointing unit includes a cylindrical joint having a plurality of holes which are formed adjacent to its edge portion so as to extend in the radial direction, a pipe having a flange on the external surface and inserted into the joint at its one end side, a ring-shaped seal member disposed between the inner surface of the joint and the outer surface of the pipe, and a connecting member made of elastic material and disposed between the joint and the pipe. The connecting member includes an annular portion and a plurality of leg portions extending in the axial direction from the annular portion. The annular portion is inserted between the inner surface of the joint and the outer surface of the pipe in such a manner that the ring-shaped seal member is fitted in a stable manner. Each of the leg portions has a protrusion and a groove. The protrusion protrudes outwardly in the radial direction and is fitted into the penetrating holes of the joint to connect the joint and the connecting member. The groove is formed on the inner surface of the leg portion and is engaged with the flange to connect the connecting member and the pipe.

However, in the above-described pipe jointing unit, the inner diameter of the edge portion of the joint is inevitably larger than the outer diameter of the pipe because the ring-shaped seal member in disposed between the inner surface of the joint and the outer surface of the pipe. Therefore, if the pipe swings in the radial direction relative to the joint by virtue of vehicle vibration, errors in the initial assembly and the like, the pipe does not swing so that the edge potion of the joint is the fulcrum, but swings such that each tip of the leg portions of the connecting member is the fulcrum. Because the connecting member is made of elastic material such as a resin, when the pipe swings in the radial direction relative to the joint, each of the leg portions is pushed by the outer surface of the pipe and is deformed outwardly in the radial direction.

If the leg portions are kept deformed toward the outer radial direction for only a short period of time, the leg portions return to undeformed shape by virtue of the elasticity of the elastic material. However, if the leg portions are maintained in the deformed state during a long period of time, the leg portions are unable to return to the undeformed state by virtue of what is referred to as the creep phenomenon of resin and the like.

As a result, the groove in the leg portion is not engaged completely with the flange of the pipe and so the force resisting the pulling out of the pipe from the connecting member is reduced. The pipe may thus be pulled out of the connecting member by vehicle vibration, an increase of the internal pressure of the pipe and the like.

In light of the foregoing, a need exists for a jointing or joining unit of a relatively simple construction that possesses an improved resistance force against pulling the pipe out of the connecting member

SUMMARY OF THE INVENTION

A pipe jointing unit in accordance with the present invention includes a cylindrical joint having a plurality of generally radially extending holes formed adjacent to its edge portion, a pipe having a flange on its outer surface and positioned in the joint at its end side, a ring-shaped seal member disposed between the inner surface of the joint and the outer surface of the pipe, and a connecting member made of elastic material. The connecting member has an annular portion and a plurality of leg portions extending in the axial direction from the annular portion. The annular portion of the connecting member is located between the joint and the pipe in such a manner that the ring-shaped seal member is fitted stably. Each of the leg portions has a protrusion and a groove, with the protrusion extending outwardly in the radial direction and fitted into one of the holes to connect the joint and the connecting member. The groove is formed on the inner surface of the leg portion and engages the flange to connect the connecting member and the pipe. A guide member includes a guide portion disposed between the inner surface of the edge portion of the joint and the outer surface of the pipe.

In accordance with the present invention, the guide portion of the guide member is disposed between the inner surface of the edge portion of the joint and the outer surface of the pipe and so the pipe is restricted from swinging in the radial direction relatively against the joint. The pipe is thus inhibited from swinging in such a manner that the tips of the leg portions of the connecting member serve as a fulcrum. If the pipe is swung in the radial direction relatively against the joint, because each of the leg portions cannot be deformed outwardly in the radial direction, it is possible to avoid situations in which the leg portions in the deformed state by virtue of the creep phenomenon of resin are unable to return to the undeformed state. Thus, the reliability of the resistance force against pulling the pipe out of the connecting member by vehicle vibration, an increase in the internal pressure of the pipe and the like is improved.

The guide portion of the guide member preferably has an annular shape and possesses an inner diameter substantially equal to the outer diameter of the pipe and an outer diameter substantially equal to the inner diameter of the edge portion of the joint. With this construction, the pipe is further restricted from swinging in the radial direction relatively against the joint, and the reliability of the resistance force against pulling the pipe out of the connecting member is further improved.

The guide member preferably further includes a plurality of arms extending axially from the guide portion so that the tip portion of each of the arms is able to engage the flange of the pipe, and an engaging portion extending in the axial direction from the guide portion so that the tip portion of the engaging portion is able to engage the outer surface of the edge portion of the joint. The length of each of the arms and the length of the engaging portion are selected so that the flange of the pipe is completely engaged with the groove of the leg portion by the engagement between the flange and the tip portion of each of the arms and so that the guide portion is completely disposed between the inner surface of the edge portion of the joint and the outer surface of the pipe only when the engaging portion is completely engaged with the outer surface of the edge portion of the joint. With this construction, if the groove of the leg portion is not completely engaged with the flange of the pipe by virtue of incomplete insertion of the pipe into the joint, the tip portion of the engaging portion of the guide member cannot be engaged with the outer surface of the edge portion of the joint because the flange is engaged with the tip portion of the arms of the guide member. It is thus possible to determine whether the groove of the leg portion is completely engaged with the flange by checking whether the engaged portion of the guide member is completely engaged with the edge portion of the joint.

It is preferable also that the guide portion of the guide member have an annular corner possessing an arc-shaped cross section and located at the side of the guide portion opposite to the arms. The pipe is thus able to swing in such a manner that the annular corner is the fulcrum. Therefore, compression stress of the pipe at the contact point with the annular corner can be reduced. This improves the reliability and endurance of the pipe itself under the condition of vehicle vibration and the like.

The guide member must be inserted into the joint while the tips of the arms are positioned at a predetermined position relative to the tip of the leg portions in the circumferential direction to avoid contact between the tips of the arms and the tips of the leg portions. It is thus preferable that each of the arms is tapered toward the tip portion of the arm. Thus, even if the guide member is inserted into the joint with the tip of the arms slightly shifted relative to the predetermined or correct position in the circumferential direction, the guide member is automatically moved toward the predetermined or correct position in the circumferential direction while the tapered tip of the arms is guided on the tip of the leg portions. Thus, the guide member can be completely inserted into the joint at the predetermined position in the circumferential direction. Thus, under blind assembly work, the efficiency of the work can be improved.

The tip of each of the arms and the tip of each of the leg portions are shaped so that the tip of the arms is not elastically deformed in the radial direction when the guide member is pressed in the axial direction under the condition that the tip of each of the arms and the tip of each of the leg portions contact each other. With such a construction, even if the guide member is inserted into the joint under the condition that the tip of each of the arms and the tip of each of the leg portions contact each other, because the tip of the arms is not elastically deformed and the guide member cannot be completely inserted into the joint, the engaged portion cannot be engaged with the edge portion of the joint. Therefore, irregular or incorrect assembly can be avoided.

According to another aspect of the invention, a pipe jointing unit includes a tubular joint in which is formed at least one through hole adjacent an edge portion of the tubular joint, a pipe positioned in the joint having an outer surface on which is located a flange, a ring-shaped seal member disposed between the inner surface of the joint and the outer surface of the pipe, an elastic connecting member, and a guide member. The connecting member includes an annular portion and at least one leg portion extending axially from the annular portion, with the annular portion positioned between the joint and the pipe. A portion of the leg portion engages the flange on the pipe to connect the connecting member and the pipe and a portion of the leg portion engages the hole in the joint to connect the joint and the connecting member. The guide member has a guide portion disposed between an inner surface of the edge portion of the joint and the outer surface of the pipe.

BRIEF DESCRIPTION OF THE DRAWING FIGURES

The foregoing and additional features and characteristics of the present invention will become more apparent from the following detailed description considered with reference to the accompanying drawing figures in which like elements are designated by like reference numerals and wherein.

DETAILED DESCRIPTION OF THE INVENTION

Figure 1:
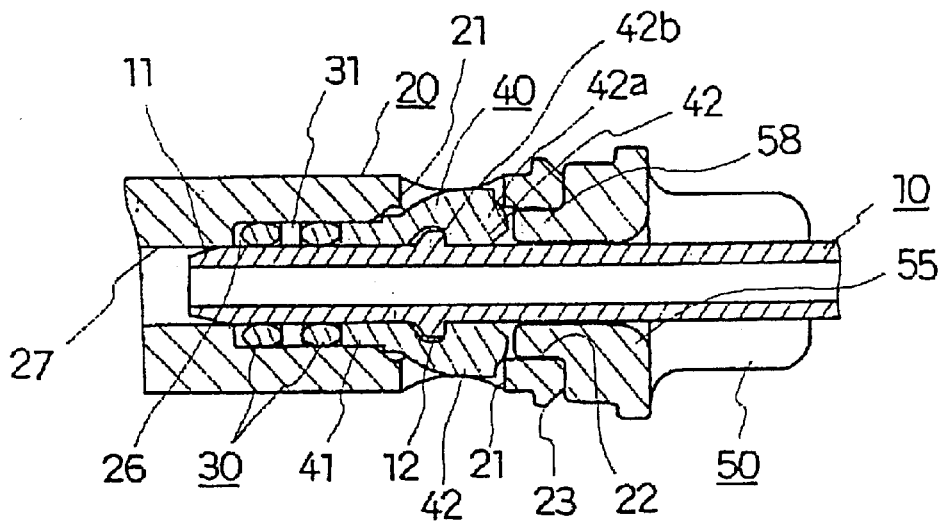
FIG. 1 is a cross-sectional view of a pipe jointing unit according to the present invention.

Referring initially to FIG. 1, the pipe jointing unit in accordance with a preferred embodiment of the present invention mainly consists of a cylindrical or tubular joint 20 in which is accommodated a pipe 10, a pair of O-rings 30, 30 forming ring-shaped seal members accommodated in the joint 20 and surrounding the pipe 10, a connecting member 40 accommodated in the joint 20 and holding the pipe 10 and the O-rings 30, 30 in the joint 20, and a guide member 50 detachably connected to the joint 20.

Figure 3:
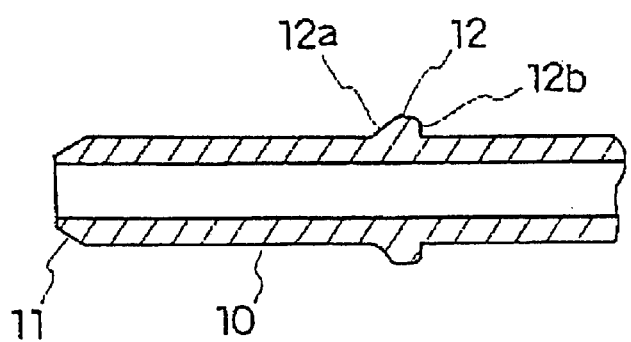
FIG. 3 is a cross-sectional view of a portion of the pipe.

As shown in FIG. 1 and FIG. 3, the pipe 10 is cylindrically shaped and possesses a tip having a tapered portion 11 that is tapered to a narrowing dimension toward the tip. The pipe 10 is provided with a radially outwardly extending flange 12 on its outer surface. The flange 12 possesses a tilted or angled surface 12a at the front side facing towards the tapered tip portion 11 (i.e., the left side in FIG. 1) and vertically oriented surface 12b at the opposite rear side (i.e., the right side in FIG. 1). The vertically oriented surface 12b of the flange 12 is generally perpendicular to the longitudinal axis of the pipe 10.

The joint 20 forms a part of a connecting element of the pipe 10 and can be made of plastic or metal. The joint 20 has a pair of penetrating holes 21, 21 formed adjacent the edge portion of the joint 20 and extending in the radial direction. The joint 20 also includes a flange 23 formed on the outer surface of the edge portion of the joint 20.

The joint 20 is also provided with a stepped bore having two different diameter portions defined by first and second inner surfaces 27, 26. The inner diameter of the first inner surface 27 is substantially equal to the outer diameter of the pipe 10. The inner diameter of the second inner surface 26 is larger than the inner diameter of the first inner surface 27.

The O-rings 30, 30 are fitted on the pipe 10 and are disposed in the region of the second inner surface 26. A support ring 31 is positioned between the O-rings 30, 30.

The connecting member 40 is made of an elastic material, such an resin, and has an annular portion 41 and a pair of leg portions 42, 42 extended in the axial direction from the annular portion 41. The outer diameter of the annular portion 41 is substantially equal to the inner diameter of the second inner surface 26 of the joint 20. The inner diameter of the annular portion 41 is substantially equal to the outer diameter of the pipe 10. Each of the leg portions 42, 42 possesses a generally U-shaped axial cross-section. In addition, the leg portions 42, 42 each include a protrusion 42a, 42a at the outer side of the middle portion and a groove 42b, 42b at the inner side of the middle portion.

The guide member 50 is also made of elastic material, such as resin. As shown in FIGS. 1, 2 and 4–6, the guide member 50 has an annular and axially extending guide portion 58, a pair of arms 52, 52 extending in the axial direction (i.e., in the leftward direction of FIG. 1) from the guide portion 58, a pair of engaging portions 53, 53 extending in the axial direction (i.e., in the leftward direction in FIG. 1) from the guide portion 58, and a pair of handle portions 54, 54 extending in the axial direction (i.e., in the rightward direction in FIG. 1) from the guide portion 58.

The tip of each engaging portion 53, 53 is provided with a radially inwardly directed inner protrusion 53a, 53a. When the handle portions 54, 54 are pressed radially inwardly to be elastically deformed, the engaging portions 53, 53 are elastically deformed radially outwardly away from each other. When the pressing force applied to the handle portions 54, 54 is removed, the engaging portion 53, 53 elastically return to their original shape or position.

Figure 4:
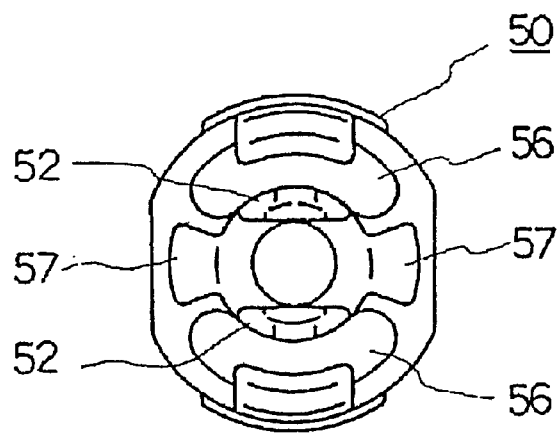
FIG. 4 is a left side view of the guide member illustrated in FIG. 1.
Figure 5:
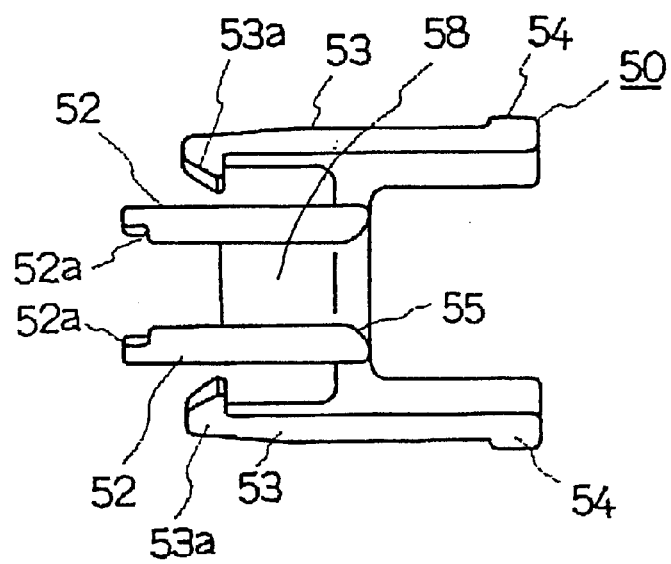
FIG. 5 is a top side view of the guide member illustrated in FIG. 1.

As shown in FIG. 4, the guide member 50 has a pair of holes 56, 56 for reducing the recovering force against the deformation of the guide member 50 in order to improve the detachability of the guide member 50. The holes 56, 56 also allow water and/or mud invaded between the joint 20 and the guide member 50 to be relatively easily eliminated.

Figure 2:
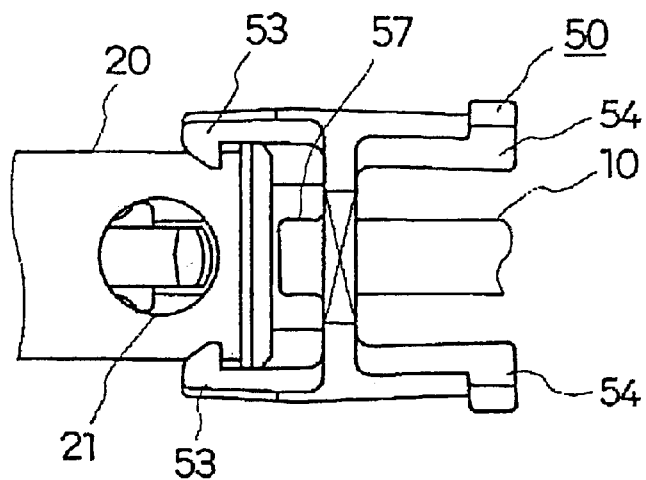
FIG. 2 is a top view of the pipe jointing unit of the present invention illustrating engagement of the guide member and the joint.

As shown in FIGS. 2 and 4, the guide member 50 has a pair of seat portions 57, 57 that provide improved detachability of the guide member 50. That is, the deformation of the engaging portions 53, 53 and the handle portions 54, 54 is performed in such a manner that the annular guide portion 58 functions as the fulcrum. Because the seat portions 57, 57 contact the edge portion of the joint 20, the position of the guide portion 58, as well as the entire guide member 50, is shifted to the right in FIG. 2, and the distance from the guide portion 58 functioning as the fulcrum to the tip of the engaging portion 53, 53 functioning as the point of action is increased. Therefore, the movable distance of the tip of the engaging portion 53, 53 in response to the pressing operation of the handle portion 54, 54 is increased. As a result, the detachability of the guide member 50 is improved.

Figure 6:
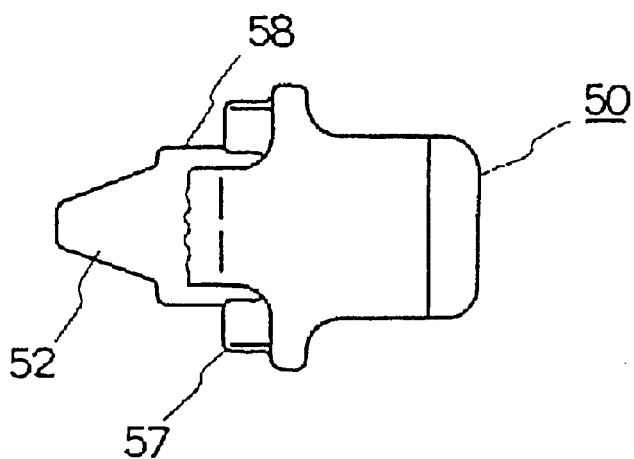
FIG. 6 is a front view of the guide member illustrated in FIG. 1.
Figure 7:
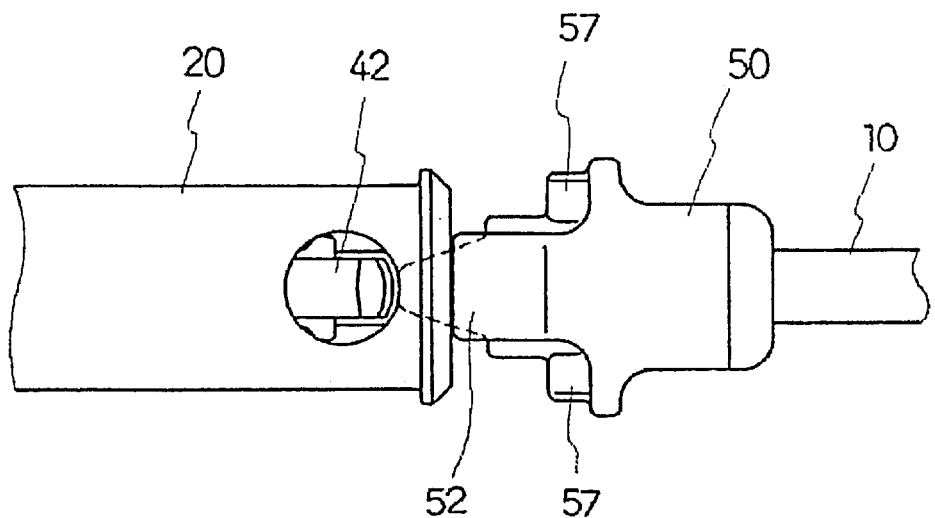
FIG. 7 is a front view showing an irregular assembly of the guide member.

As shown in FIG. 6, the two arms 52, 52 possess a tapering configuration so that they narrow toward the tip portion.

The outer diameter of the annular guide portion 58 is substantially equal to the inner diameter of the edge portion of the joint 20, and the inner diameter of the annular guide portion 58 is substantially equal to the outer diameter of the pipe 10. The annular guide portion 58 of the guide member 50 is provided with an annular rounded corner 55 possessing an arc-shaped cross-section and located at the side of the annular guide portion 58 opposite to the arms 52 (i.e., in the right direction in FIG. 1).

The assembly of the pipe jointing unit according to the present invention is as follows. First, one of the O-rings 30, the support ring 31, and the other the O-ring 30 are inserted into the joint 20 in this order from the end. The annular portion 41 of the connecting member 40 is then inserted into the joint 20 and the protrusions 42a, 42a of the connecting member 40 are engaged with the penetrating holes 21, 21 in the joint 20. In this state, the tip of the pipe 10 is inserted through the bore of the annular guide portion 58 of the guide member 50 and is inserted into the joint 20 from the end. The pipe 10 is completely assembled with respect to the joint 20 when the flange 12 of the pipe 10 is completely engaged with the grooves 42b, 42b of the respective leg portions 42, 42.

Next, the guide member 50 is inserted into the joint 20 from the end of the joint. The inner protrusions 53a, 53a of the engaging portions 53,53 engage the flange 23 on the outer surface of the edge portion of the joint 20. Thus, the whole assembly of all of the components is finished. Of course, the assembly or insertion of the guide member 50 may be performed simultaneously with that of the pipe 10. In such a case, it is preferable that the guide member 50 and the pipe 10 are assembled to the joint 20 under the condition that the tips of the arms 52, 52 contact the flange 12 of the pipe 10.

When the assembly of all of the components is finished, even if a pull-out force tending to pull the pipe 10 out of the joint 20 is applied to the pipe 10 by virtue of the internal pressure of the pipe 10 or an external force, the pipe 10 is securely retained in the joint 20 because the vertical surface 12b of the flange 12 is securely engaged with the grooves 42b, 42b, and the protrusions 42a, 42a are securely engaged with the penetrating holes 21, 21. Also, the internal fluid of the pipe 10 does not leak because the O-rings 30, 30 maintain a seal between the outer surface of the pipe 10 and the second inner surface 26 of the joint 20.

When the assembly of all the components is completed, the annular guide portion 58 of the guide member 50, whose inner diameter is substantially equal to the outer diameter of the pipe 10 and whose outer diameter is substantially equal to the inner diameter of the edge portion of the joint 20, is disposed between the internal surface of the edge portion of the joint 20 and the external surface of the pipe 10 as shown in FIG. 1. Therefore, swinging movement of the pipe 10 in the radial direction against the joint 20 is restricted. Thus, the pipe 10 does not swing in such a manner that the tips of the leg portions 42, 42 of the connecting member 40 function as fulcrum. If the pipe 10 swings in the radial direction relative to or against the joint 20, the leg portions 42, 42 are not deformed outwardly in the radial direction. Consequently, difficulties associated with the leg portions 42, 42 being unable to return to their original shape or position by virtue of the creep phenomenon of resin are not likely to arise. Therefore, the reliability of the resistance force against pulling the pipe 10 out of the joint 20 by vehicle vibration, an increase in the internal pressure of the pipe 10 and the like is improved.

As mentioned above, the annular guide portion 58 of the guide member 50 is provided with the annular corner 55 having the arc-shaped cross-section and located at the side of the annular guide portion 58 opposite to the arms 52, 52. If the pipe 10 swings, it swings in such a manner that the annular corner 55 functions as a fulcrum. Therefore, compression stress of the pipe 10 at the contact point with the annular corner 55 can be reduced. As a result, the reliability and endurance of the pipe 10 against vehicle vibration and the like is improved.

The guide member 50 can also be used for checking whether the pipe 10 is completely engaged with the joint 20. That is, in the state that the grooves 42b, 42b of the leg portion 42 are not completely engaged by the flange 12 of the pipe 10 as a result of incomplete insertion of the pipe 10 into the joint 20, the inner protrusions 53a, 53a of the engaging portion 53 of the guide member 50 cannot be engaged with the flange 23 of the outer surface of the edge portion of the joint 20 because the flange 12 of the pipe 10 is engaged or in contact with the tip portion of the arms 52, 52 of the guide member 50. It is thus possible to check whether the grooves 42b, 42b of the leg portion 42 are completely engaged with the flange 12 of the pipe 10 by checking whether the engaged portion 53 of the guide member 50 is completely engaged with the edge portion of the joint 20. If the pipe 10 is not completely inserted into the joint 20, the pipe 10 can be completely inserted into the joint 20 by further pushing the guide member 50 toward the joint 20 because the flange 12 of the pipe 10 is pushed by the tip portions of the arms 52, 52 of the guide member 50.

It is necessary that the guide member 50 be inserted into the joint 20 with the tip portions of the arms 52, 52 shifted by 90° in the circumferential direction with respect to the tips of the leg portions 42, 42 so as not to contact the tip portions of the arms 52, 52 and the tips of the leg portions 42, 42 against each other. Because each of the arms 52, 52 is tapered in a narrowing fashion toward the respective tip portion, if the guide member 50 is inserted into the joint 20 with the tip portions of the arms 52, 52 slightly shifted in the circumferential direction from the correct or regular relative position, the guide member 50 is moved automatically toward the regular or correct relative position because the tapered tip portions of the arms 52, 52 function as a guide on the tips of the leg portions 42, 42. The guide member 50 can thus be completely inserted into the joint 20 at the correct or regular relative circumferential position. As a result, under blind assembly of the unit, improved work efficiency can be realized.

Figure 8:
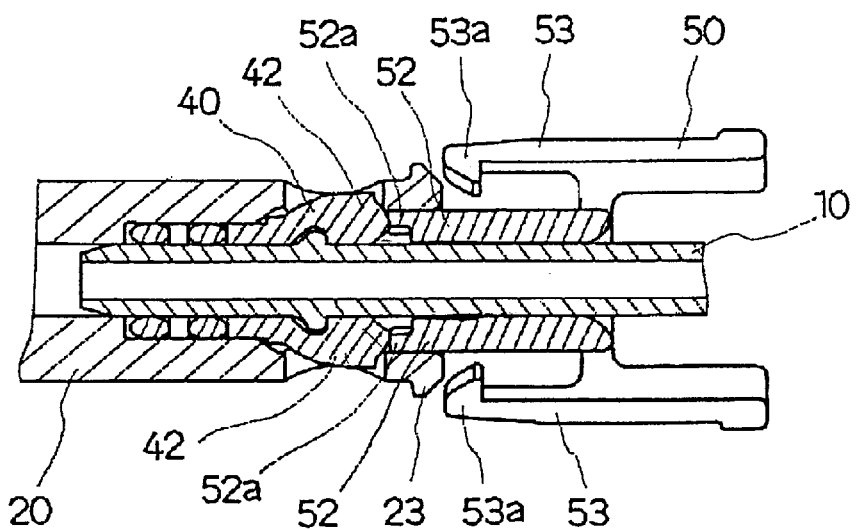
FIG. 8 is a cross-sectional view from the top side of FIG. 7.

Further, as noted above, the protrusions 52a, 52a are disposed at the tip portions of the arms 52, 52. If the guide member 50 is inserted into the joint 20 at an irregular or incorrect relative position in the circumferential direction so that the tip portions of the arms 52, 52 and the tips of the leg portions 42,42 contact each other, when the guide member 50 is further pressed axially toward the inner side of the joint 20, the tip portions of the arms 52, 52 and the tips of the leg portions 42,42 are not elastically deformed and the inner protrusions 53a, 53a of the engaging portions 53,53 are not engaged with the flange 23 of the edge portion of the joint 20 as shown in FIG. 8. Therefore, if the guide member 50 is inserted into the joint 20 in an irregular or incorrect relative circumferential position, the engaging portions 53, 53 cannot engage the edge portion of the joint 20. Therefore, an irregular or improper assembly in which the guide member 50 is inserted completely into the joint 20 at the irregular or incorrect relative position under when the flange 12 is not engaged completely with the grooves 42b, 42b of the leg portions 42 as shown in FIG. 8 can be avoided.

The principles, preferred embodiment and mode of operation of the present invention have been described in the foregoing specification. However, the invention which is intended to be protected is not to be construed as limited to the particular embodiment described. Further, the embodiment described herein is to be regarded as illustrative rather than restrictive. Variations and changes may be made by others, and equivalents employed, without departing from the spirit of the present invention. For example, it is possible to connect each rotating member by using a dog clutch instead of the spline.

What is claimed is:

1. A pipe jointing unit comprising:
   a cylindrical joint having a plurality of generally radially extending holes formed adjacent an edge portion of the cylindrical joint;
   a pipe having an outer surface from which extends a flange, said pipe being positioned in the joint;
   a ring-shaped seal member disposed between an inner surface of the joint and an outer surface of the pipe;
   an elastic connecting member that includes an annular portion and a plurality of leg portions extending axially from the annular portion, the annular portion being positioned between the joint and the pipe in such a manner that the ring-shaped seal member is fitted stably, each of the leg portions having a protrusion and a groove, the protrusion of each leg portion protruding generally radially outwardly and being fitted into one of the holes in the joint to connect the joint and the connecting member, the groove of each leg portion being formed on an inner surface of the leg portion and engaging the flange to connect the connecting member and the pipe;
   a guide member having a guide portion disposed between an inner surface of the edge portion of the joint and the outer surface of the pipe so that at least a portion of an outer surface of the guide portion faces in a direction of the inner surface of the edge portion of the joint and at least a portion of the inner surface of the guide portion faces in a direction of the outer surface of the pipe; and
   wherein the guide portion of the guide member has an annular shape possessing an inner diameter substantially equal to an outer diameter of the pipe and an outer diameter substantially equal to an inner diameter of the edge portion of the joint.

2. The pipe jointing unit according to claim 1, wherein the guide member also includes a pair of arms extending axially from the guide portion and the guide portion of the guide member is provided with an annular corner having an arc-shaped cross-section, said annular corner being located at a side of the guide portion opposite the arms.

3. The pipe jointing unit according to claim 1, wherein the guide member includes a plurality of arms extending axially from the guide portion so that a tip portion of each of the arms is engageable with the flange of the pipe, the guide member including an engaging portion extending in the axial direction from the guide portion so that a tip portion of the engaging portion is engageable with an outer surface of the edge portion of the joint, the arms and the engaging portion possessing a length such that the flange of the pipe is completely engaged with the groove of each leg portion by engagement between the flange and the tip portion of each of the arms, and the guide portion is completely disposed between the inner surface of the edge portion of the joint and the outer surface of the pipe only when the engaged portion is completely engaged with the outer surface of the edge portion of the joint.

4. The pipe jointing unit according to claim 3, wherein each of the arms is tapered towards the tip portion.

5. A pipe jointing unit according to claim 3, wherein the tip of each of the arms and a tip of each of the leg portions are shaped so that the tip of the arms is not elastically deformed in the radial direction when the guide member is pressed in the axial direction under a condition in which the tip of each of the arms and the tip of each of the leg portions contact each other.

6. A pipe jointing unit comprising;
   a tubular joint in which is formed at least one through hole adjacent an edge portion of the tubular joint;
   a pipe having an outer surface on which is located a flange, said pipe being positioned in the joint;
   a ring-shaped seal member disposed between an inner surface of the joint and an outer surface of the pipe;
   an elastic connecting member that includes an annular portion and at least one leg portion extending axially from the annular portion, the annular portion being positioned between the joint and the pipe, a portion of said at least one leg portion engaging the flange on the pipe to connect the connecting member and the pipe and a portion of said at least one leg portion engaging the at least one hole in the joint to connect the joint and the connecting member;

a guide member having a guide portion disposed between an inner surface of the edge portion of the joint and the outer surface of the pipe so that at least a portion of an outer surface of the guide portion faces in a direction of the inner surface of the edge portion of the joint and at least a portion of the inner surface of the guide portion faces in a direction of the outer surface of the pipe; and wherein the guide portion of the guide member is annular in shape and possesses an inner diameter substantially equal to an outer diameter of the pipe and an outer diameter substantially equal to an inner diameter of the edge portion of the tubular joint.

7. The pipe jointing unit according to claim 6, wherein the guide member also includes a pair of arms extending axially from the guide portion and the guide portion of the guide member possesses an annular corner having an arc-shaped cross-section, said annular corner being located at a side of the guide portion opposite the arms.

8. The pipe jointing unit according to claim 6, wherein the guide member includes a plurality of arms extending axially from the guide portion so that a tip portion of each of the arms is engageable with the flange of the pipe.

9. The pipe jointing unit according to claim 8, wherein each of the arms is tapered towards the tip portion.

10. The pipe jointing unit according to claim 6, wherein the guide member includes a pair of engaging portions extending axially from the guide portion so that a tip portion of each engaging portion is engageable with an outer surface of the edge portion of the joint.

11. The pipe jointing unit according to claim 6, wherein the flange on the pipe includes one surface that is inclined with respect to a central axis of the pipe and another surface that is substantially perpendicular to the central axis of the pipe.

* * * * *